United States Patent [19]

Ishimoto et al.

[11] Patent Number: 5,757,893
[45] Date of Patent: May 26, 1998

[54] MODEM APPARATUS COMPRISING RINGING SIGNAL DETECTOR FOR OUTPUTTING DETECTION SIGNAL TO MODEM CIRCUIT IN RESPONSE TO INSTRUCTION DATA FROM COMPUTER

[75] Inventors: Shin-ichi Ishimoto; Hidenori Mitani, both of Tokyo, Japan

[73] Assignee: Mitsubishi Denki Kabushiki Kaisha, Tokyo, Japan

[21] Appl. No.: 598,915

[22] Filed: Feb. 9, 1996

[30] Foreign Application Priority Data

Aug. 18, 1995 [JP] Japan ................... 7-210567

[51] Int. Cl.⁶ ........................................ H04M 11/00
[52] U.S. Cl. ................. 379/93.26; 379/28; 375/222
[58] Field of Search ......................... 375/219–222, 375/224, 377; 379/90, 93, 96, 98, 1, 27–30, 34, 90.01, 93.01, 93.08, 93.26, 93.28, 93.29, 93.31–93.34

[56] References Cited

U.S. PATENT DOCUMENTS

| | | | |
|---|---|---|---|
| 4,841,561 | 6/1989 | Hill | 375/222 |
| 5,003,573 | 3/1991 | Agah et al. | 379/1 |

FOREIGN PATENT DOCUMENTS

| | | |
|---|---|---|
| 4-56446 | 2/1992 | Japan . |
| 5-347647 | 12/1993 | Japan . |
| 7-23129 | 1/1995 | Japan . |

Primary Examiner—Curtis Kuntz
Assistant Examiner—Stephen W. Palan

[57] ABSTRACT

In a modem apparatus including a modem circuit, operatively connected to a computer and a communication line, a ringing signal detector detects a ringing signal received through the communication line, generates a detection signal, and then, outputs the detection signal to the modem circuit. A register receives from the host computer instruction data for instructing the ringing signal detector to output the detection signal, and then, stores therein the instruction data. Then, the ringing signal detector outputs the detection signal to the modem circuit when the instruction data is stored in the register. A pseudo ring signal generator outputs a pseudo ring signal in response to instruction data being stored in the register by the host computer. A signal frequency selection circuit instructs and controls the pseudo ring signal generator, in response to the instruction data to select the signal frequency of the pseudo ringing signal. A timing chart controller may also be used to control the pseudo ringing signal generator according to instruction data being written into the register by the host computer.

20 Claims, 8 Drawing Sheets

First Preferred Embodiment

First Preferred Embodiment

Second Preferred Embodiment

Fig.3 Third Preferred Embodiment

Fig. 4  Fourth Preferred Embodiment

*Fig.6A* Clock Signal
*Fig.6B* Latch Signal L1
*Fig.6C* Latch Signal L2
*Fig.7A* First Pseudo Ringing Signal
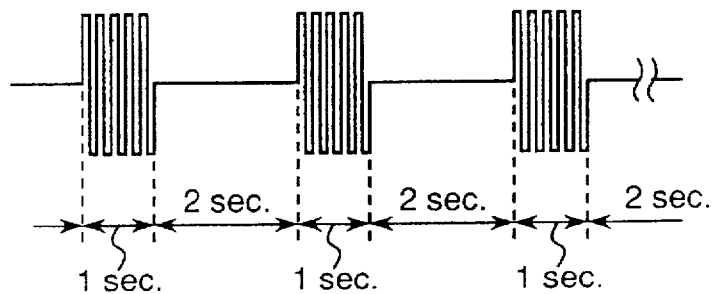
*Fig.7B* Second Pseudo Ringing Signal
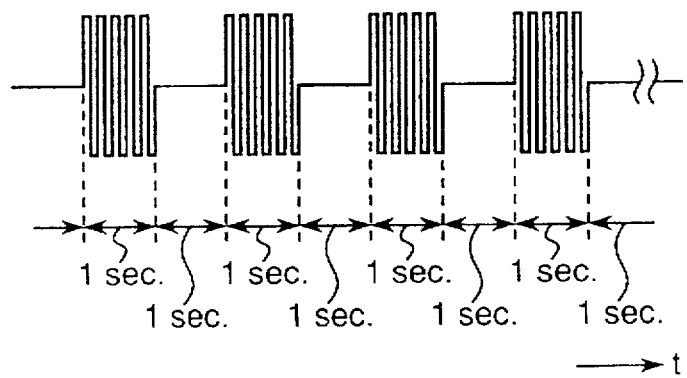

MODEM APPARATUS COMPRISING RINGING SIGNAL DETECTOR FOR OUTPUTTING DETECTION SIGNAL TO MODEM CIRCUIT IN RESPONSE TO INSTRUCTION DATA FROM COMPUTER

BACKGROUND OF THE INVENTION

1. Field of the Invention

The present invention relates to a modulator and demodulator apparatus (referred to as a modem apparatus hereinafter) comprising a checking or inspection means for checking an operation of the modem apparatus, and in particular, to a modem apparatus comprising a ringing signal detector for outputting a detection signal to a modem circuit in response to instruction data sent from a host computer such as a microcomputer, a work station computer or the like.

2. Description of the Related Art

There has been conventionally used a ringing signal having a signal frequency of 15 Hz to 20 Hz as an incoming call to a telephone terminal such as a telephone receiver, a modem apparatus or the like. The ringing signal is defined by the Japanese domestic telecommunication equipment rules so that the ringing signal is to be intermittently transmitted at an intermittent duty ratio of 20 IPM±20% and a make ratio of 33±10% in the conditions of the signal transmission format of the ringing signal. Furthermore, in a modem apparatus provided with a modem circuit having a low consumption current mode (or sleeping mode) and a normal operation mode, the ringing signal is inputted to the modem circuit to be used as a signal for waking up the modem circuit from the low consumption current mode and for setting the modem circuit to the normal operation mode.

FIG. 8 shows a prior art integrated circuit card type modem apparatus 100, wherein the integrated circuit card is referred to as an IC card hereinafter.

Referring to FIG. 8, the prior art modem apparatus 100 comprises the following components:

(a) a connector 11 which is connected directly to a bus of a host computer 10 such as a microcomputer, a work station computer or the like;

(b) a connector 4 which is connected to a telephone line 20;

(c) an interface circuit 1 which executes an interface processing between a modem circuit 2 and the host computer 10 connected to the connector 11;

(d) the modem circuit 2 which modulates and demodulates a carrier wave signal according to a signal data inputted based on a clock signal generated by a clock generator 12;

(e) a network control unit (referred to as an NCU hereinafter) 3 which is connected between the connector 4 and the modem circuit 2 and executes detection and generation of various kinds of control signals inputted through the telephone line 20; and (f) a ringing signal detector 6 which detects the ringing signal inputted from the telephone line 20 through the connector 4, generates, for example, a High-level detection signal upon detecting the ringing signal, and outputs the detection signal to the modem circuit 2.

After waking up the modem circuit 2 from the low consumption current mode to the normal operation mode by inputting the ringing signal to the modem circuit 2 through the connector 4 in a manner as described above, an access can be made from the host computer 10 to the modem circuit 2 through the connector 11 and the interface circuit 1 by means of command data or instruction data such as an AT command or the like, and then this allows the operation of the modem circuit 2 to be confirmed.

In order to inspect the functions of the above-mentioned prior art IC card type modem apparatus 100, it has been required to connect to the modem apparatus 100 to be inspected a pseudo exchange unit or a pseudo signal generator such as an exchange simulator to which a remote telephone terminal of the other party has been connected, and to input a ringing signal from the pseudo exchange unit or the pseudo signal generator to the modem apparatus 100. When such a pseudo exchange unit or pseudo signal generator is used, there is such a problem that a large-sized inspection apparatus has been required. Furthermore, when the modem apparatus 100 is inspected in a manner as described above, there has been required about four to five seconds in order to put the remote telephone terminal of the other party into an off-hook state and then transmit a dial signal thereto so as to call the modem apparatus 100, and this results in the problem of a long inspection time that is required when inspecting a lot of modem apparati 100.

SUMMARY OF THE INVENTION

The object of the present invention is therefore to provide a modem apparatus capable of reducing the inspection time for inspecting the modem apparatus as compared with that of the prior art modem apparatus 100, and having a simple construction for the inspection.

In order to achieve the above-mentioned objective, according to one aspect of the present invention, there is provided a modem apparatus comprising:

a modem circuit, operatively connected to a computer and a communication line, for modulating a carrier wave signal so as to generate a modulated signal according to signal data inputted from said computer, for outputting the modulated signal through said communication line, for demodulating a modulated signal received through said communication line so as to generate another signal data, and for outputting another signal data to said computer;

ringing signal detecting means for detecting a ringing signal received through said communication line, generating a detection signal, and for outputting the detection signal to said modem circuit; and storage means for receiving from said computer instruction data for instructing said ringing signal detecting means to output the detection signal, and for storing therein the instruction data, wherein said ringing signal detecting means outputs the detection signal to said modem circuit when the instruction data is stored in said storage means.

According to another aspect of the present invention, there is provided a modem apparatus comprising:

a modem circuit, operatively connected to a computer and a communication line, for modulating a carrier wave signal so as to generate a modulated signal according to signal data inputted from said computer, for outputting the modulated signal through said communication line, for demodulating a modulated signal received through said communication line so as to generate another signal data, and for outputting another signal data to said computer;

ringing signal detecting means for detecting a ringing signal received through said communication line, generating a detection signal, and for outputting the detection signal to said modem circuit;

storage means for receiving from said computer instruction data for instructing to generate a pseudo ringing signal, and for storing therein the instruction data; and pseudo ringing signal generating means for generating a pseudo ringing signal, and for outputting the pseudo ringing signal to said ringing signal detecting means when the instruction data is stored in said storage means.

In the above-mentioned modem apparatus, the instruction data is preferably instruction data for instructing to generate the pseudo ringing signal, and for indicating a signal frequency of the pseudo ringing signal, and wherein said modem apparatus further comprises:

signal frequency selecting means for selectively setting the signal frequency of the pseudo ringing signal among a plurality of signal patterns of the pseudo ringing signal according to the instruction data stored in said storage means, and for controlling the pseudo ringing signal generating means to generate the pseudo ringing signal at the set signal frequency.

In the above-mentioned modem apparatus, the instruction data is preferably instruction data for instructing to generate the pseudo ringing signal, and for indicating a signal frequency of the pseudo ringing signal, and for controlling a timing chart of a generation pattern of the pseudo ringing signal, and wherein said modem apparatus further comprises:

timing chart control means for selectively setting the timing chart of the generation pattern of the pseudo ringing signal among a plurality of generation patterns of the pseudo ringing signal according to the instruction data stored in said storage means, and for controlling the pseudo ringing signal generating means so as to generate the pseudo ringing signal according to the set timing chart of the generation pattern.

The above-mentioned modem apparatus preferably further comprises:

clock generating means for generating a clock signal having a predetermined frequency, and for outputting the clock signal to said modem circuit, and wherein the pseudo ringing signal generating means generates the pseudo ringing signal by dividing a frequency of the clock signal generated by said clock generating means.

In the above-mentioned modem apparatus, the pseudo ringing signal generating means preferably comprises a plurality of latch circuits which are operatively connected in series.

In the above-mentioned modem apparatus, said modem apparatus is preferably an IC card type modem apparatus in which a circuit of said modem apparatus is provided inside an IC card type package.

In the above-mentioned modem apparatus, said modem apparatus is preferably a printed circuit board type modem apparatus in which a circuit of said modem apparatus is disposed on a printed circuit board.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 6A, 6B and 6C are timing charts of several signals generated in the pseudo ringing signal generator shown in FIG. 5, wherein FIG. 6A shows a clock signal generated in the pseudo ringing signal generator shown in FIG. 5, FIG. 6B shows a latch signal L1 generated in the pseudo ringing signal generator shown in FIG. 5, and FIG. 6C shows a latch signal L2 generated in the pseudo ringing signal generator shown in FIG. 5;

FIG. 7A is a timing chart showing a generation pattern of a first pseudo ringing signal for use in the IC card type modem apparatus shown in FIG. 4;

FIG. 7B is a timing chart showing a generation pattern of a second pseudo ringing signal for use in the IC card type modem apparatus shown in FIG. 4;

DETAILED DESCRIPTION OF THE PREFERRED EMBODIMENTS

Preferred embodiments of the present invention will be described below with reference to the accompanying drawings.

First Preferred Embodiment

Figure 1:
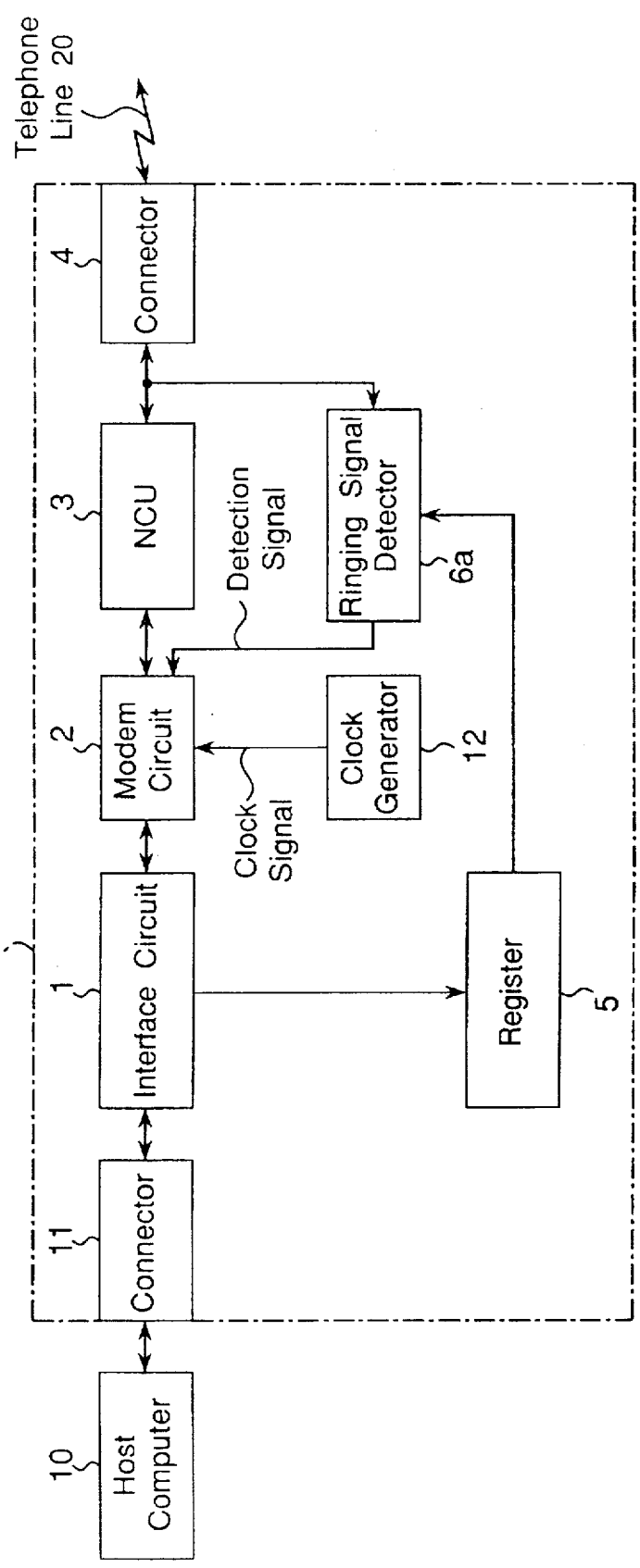
FIG. 1 is a block diagram of an IC card type modem apparatus according to a first preferred embodiment of the present invention.

FIG. 1 is a block diagram of an IC card type modem apparatus 101 according to a first preferred embodiment of the present invention.

Figure 8:
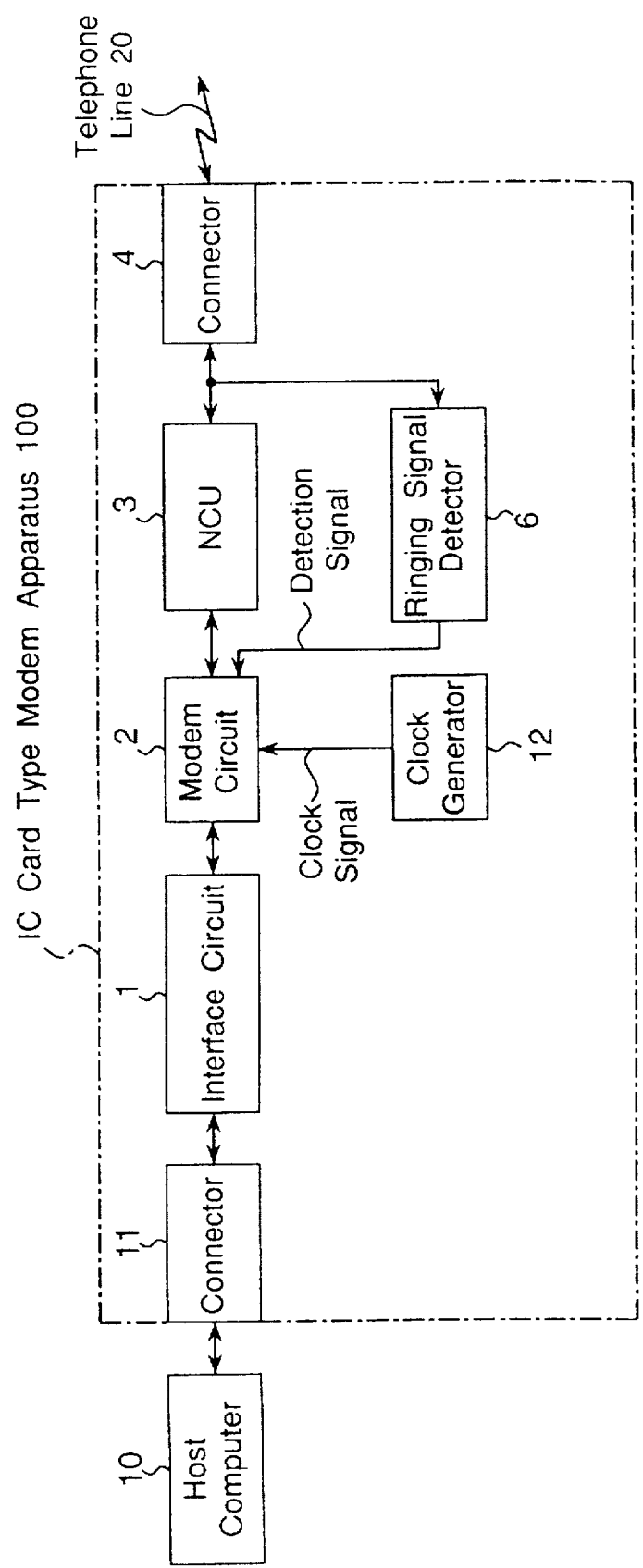
FIG. 8 is a block diagram of a prior art IC card type modem apparatus.

Referring to FIG. 1, in contrast to the prior art modem apparatus 100 shown in FIG. 8, the IC card type modem apparatus 101 of the present preferred embodiment is characterized in comprising:

(a) a register 5 which is connected to an interface circuit 1; and (b) a ringing signal detector 6a, wherein, when, for example, data "1" is inputted from a host computer 10 through a connector 11 and the interface circuit 1 to the register 5, and the data "1" is written or stored into the register 5, then the ringing signal detector 6a generates a detection signal representing detection of a ringing signal in response to the above-mentioned event, and then, outputs the detection signal to a modem circuit 2.

In the present preferred embodiment, the host computer 10 is a personal computer, a microcomputer, a work station computer, or the like.

Figure 9:
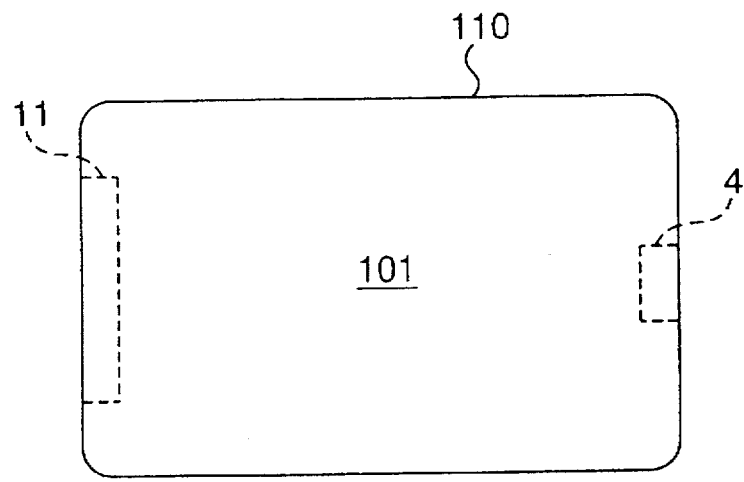
FIG. 9 is a plan view showing an external appearance of the IC card type modem apparatus shown in FIG. 1.

In the present IC card type modem apparatus 101, the circuit thereof is formed inside an IC card type package 110 as shown in FIG. 9, and the IC card type package is directly connected to the bus of the host computer 10 such as a portable personal computer, and then, is installed or built in the host computer 10. In the present case, a connector 11 for connection with the bus of the host computer 10 is formed at one end in the longitudinal direction of the package 110, while a connector 4 for connection with the telephone line is formed at another end in the longitudinal direction of the package 110.

Referring back to FIG. 1, the connector 11 of the modem apparatus 101 is directly connected to the bus of the host computer 10 for controlling the operation of the modem apparatus 101, while the connector 4 such as a modular jack (MJ) or the like of the modem apparatus 101 is connected to a pair of telephone lines 20 connected to an exchange unit of a telecommunication carrier company. The interface circuit 1 is an interface circuit for executing interface processing between a modem circuit 2 and the host computer 10 connected to the connector 11. The interface circuit 1 receives not only control data such as an AT command or the like for controlling the modem circuit 2, but also signal data which are sent from the host computer 10 through the connector 11, and then, outputs the control data to the modem circuit 2, and outputs not only the signal data received by the modem circuit 2, but also response data generated in the modem circuit 2 in response to the control data, to the host computer 10 through the connector 11. Further, the interface circuit 1 receives an instruction data "1" which is inputted from the host computer 10 through the connector 11 wherein the instruction data "1" is provided for instructing the modem apparatus 100 to operate as if a ringing signal was detected in a pseudo manner from the host computer 10 through the connector 11. After receiving the instruction data "1", the interface circuit 1 outputs and writes or stores the instruction data "1" into the register 5.

The clock generator 12 comprises a crystal oscillator and a publicly known oscillator circuit connected to the crystal oscillator, and operates to generate a clock signal having a predetermined clock frequency of, for example, 10 MHz, and output the clock signal to the modem circuit 2.

The modem circuit 2 provided in a form of, for example, an IC (Integrated Circuit) operates based on the clock signal generated by the clock generator 12, and executes control and setting processing in the modem circuit 2 in response to control data inputted from the host computer 10 through the connector 11 and the interface circuit 1, and outputs the response data and control data corresponding to a line control signal such as a ringing signal (call signal) or the like from the NCU 3 to the host computer 10 through the interface circuit 1 and the connector 11. Further, the modem circuit 2 modulates a carrier wave signal using a predetermined digital modulation method such as FSK (frequency shift keying), PSK (phase shift keying), QAM (quadrature amplitude modulation) or the like according to a signal data inputted from the host computer 10 through the connector 11 and the interface circuit 1, so as to generate a modulated signal, and then, transmits the modulated signal to the telephone line 20 through the NCU 3 and the connector 4. On the other hand, the modem circuit 2 demodulates the modulated signal received from the telephone line 20 through the connector 4 and the NCU 3 so as to generate signal data, and then, outputs the signal data to the host computer 10 through the interface circuit 1 and the connector 11.

The NCU 3 provided in a form of, for example, an IC is connected between the connector 4 and the modem circuit 2, and executes automatic off-hooking or on-hooking on the telephone line 20 connected to the connector 4 in response to the control data inputted from the host computer 10 through the connector 11, the interface circuit 1 and the modem circuit 2, then generates a selection signal, which is a dial pulse signal (DP signal) or a push-button signal (PB signal, touch tone signal, or DTMF signal), and transmits the selection signal to the telephone line 20. The ringing signal detector 6a is connected between the connector 4 and the modem circuit 2, and detects a ringing signal inputted from the telephone line 20 through the connector 4. In response to the ringing signal, the ringing signal detector 6a generates a detection signal having, for example, a High-level, and then, outputs the detection signal to the modem circuit 2, thereby informing the modem circuit 2 of reception of an incoming call to this modem apparatus 101. In response to this, the modem circuit 2 outputs a control data representing incoming or reception of the ringing signal to the host computer 10 through the interface circuit 1 and the connector 11.

Further, when the instruction data "1" is written into the register 5 in a manner as described above, the register 5 outputs the instruction data "1" to the ringing signal detector 6a. In response to the instruction data "1", the ringing signal detector 6a operates as if the ringing signal detector 6a detected a ringing signal in a pseudo manner, so that the ringing signal detector 6a generates a detection signal having, for example, the High-level, and then, outputs the detection signal to the modem circuit 2. In response to the detection signal, the modem circuit 2 outputs a control data representing the incoming of the ringing signal to the host computer 10 through the interface circuit 1 and the connector 11.

In the above-mentioned first preferred embodiment, the ringing signal is generated for one second and then generation thereof is stopped for two seconds, in a manner shown in a timing chart of generation pattern of the first pseudo ringing signal shown in FIG. 7A. This generation pattern is preferably repeated in a manner similar to the above. For this operation, the host computer 10 repeats the operation of writing the instruction data "1" into the register 5 for one second, resetting the register to "0", and then writing the instruction data "1" two seconds after the resetting. With the above-mentioned operation, the first pseudo ringing signal as shown in FIG. 7A can be generated. Further, a second pseudo ringing signal as shown in FIG. 7B is generated in a manner similar to that of the first pseudo ringing signal.

As described above, according to the first preferred embodiment, when the instruction data "1" is written into the register 5, the ringing signal detector 6a behaves or operates as if the ringing signal was called in from the telephone line 20. Therefore, the modem circuit 2 executes the same operation as that in the time when a ringing signal comes to the modem apparatus 101. In other words, by only writing the instruction data "1" into the register 5 from the host computer 10 through the connector 11 and the interface circuit 1, the modem circuit 2 outputs the control data representing the incoming of the ringing signal to the host computer 10. Therefore, an inspection for confirming the operation of an incoming call to the modem circuit 2 can be performed remotely from the host computer 10.

In the first preferred embodiment, the inspection for confirming the operation of the modem circuit 2 can be performed with an extremely simple construction of the register 5 and the ringing signal detector 6a without using any exchange simulator nor the remote telephone terminal. Further, by only writing the instruction data "1" from the host computer 10 into the register 5, the inspection for confirming the operation of the modem circuit 2 can be performed. Therefore, an inspection preparing time required or inspection setting time for preparing the inspection (referred to as an inspection preparing time hereinafter) can be remarkably reduced as compared with that of the prior art modem apparatus 100.

Furthermore, when the modem circuit 2 is a modem circuit having a low consumption current mode (or sleeping mode) and a normal operation mode in a manner similar to that of the prior art modem apparatus 100, the modem circuit 2 can be waked up from the low consumption current mode to the normal operation mode by writing the instruction data "1" into the register 5, so that the operation of the modem circuit 2 can be confirmed and the modem circuit 2 can be made to execute an actual setting control processing.

In the above-mentioned first preferred embodiment, the data "1" is used as the instruction data to be written into the register 5. However, the present invention is not limited to this, and data having another predetermined value may be used.

In the above-mentioned first preferred embodiment, the register 5 and the ringing signal detector 6a are constituted as the circuits separated from the interface circuit 1. However, the present invention is not limited to this, and the register 5 and the ringing signal detector 6a may be constituted by circuit elements included in the interface circuit 1. Furthermore, the ringing signal detector 6a may be provided inside the NCU 3.

Second Preferred Embodiment

Figure 2:
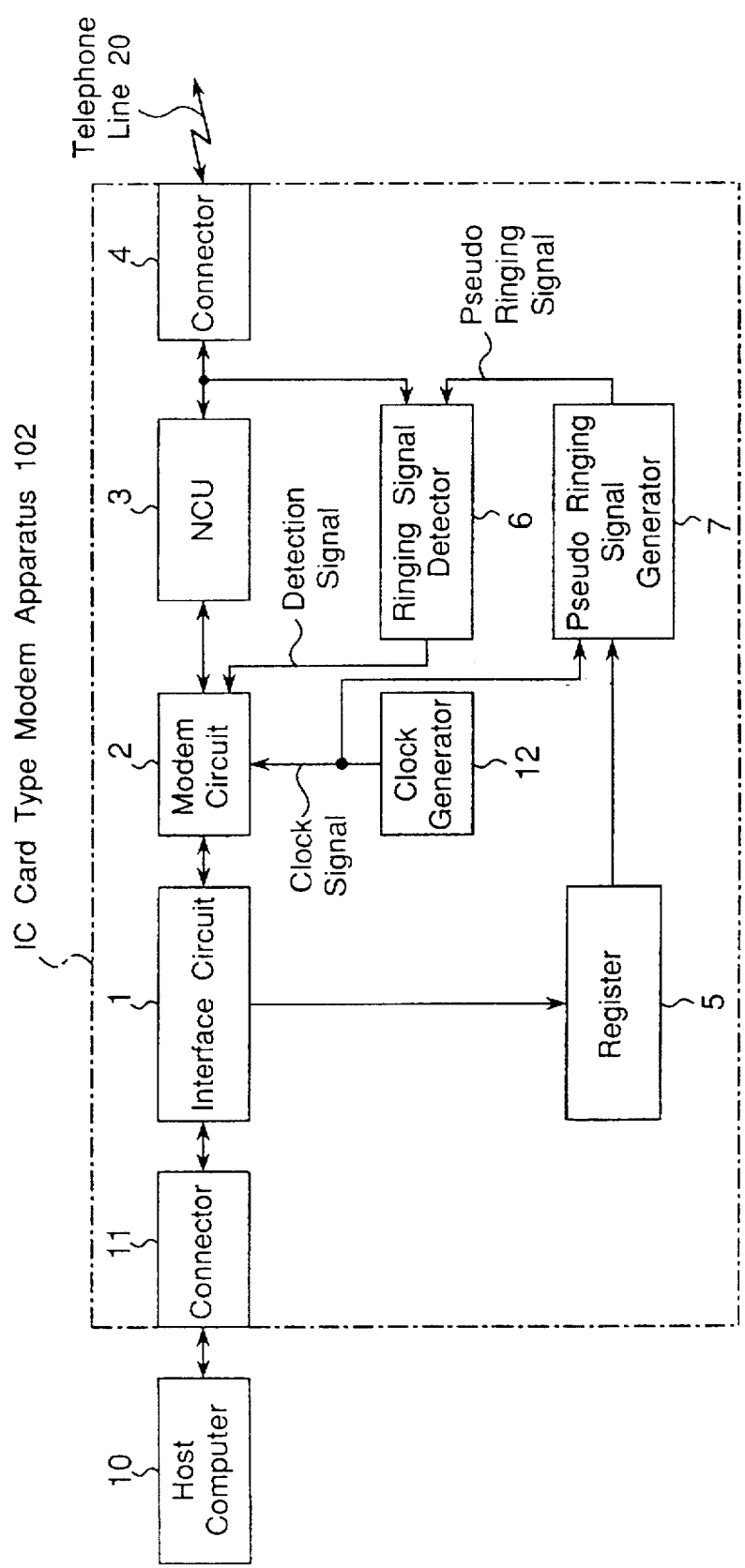
FIG. 2 is a block diagram of an IC card type modem apparatus according to a second preferred embodiment of the present invention.

FIG. 2 is a block diagram of an IC card type modem apparatus 102 according to a second preferred embodiment of the present invention.

In FIG. 2, the same components as those shown in FIGS. 1 and 8 are denoted by the same reference numerals shown in FIGS. 1 and 8. The IC card type modem apparatus 102 of the second preferred embodiment differs from that of the first preferred embodiment in the following points:

(1) The present modem apparatus 102 comprises the prior art ringing signal detector 6 shown in FIG. 8 which is slightly different from the ringing signal detector 6a shown in FIG. 1.

(2) The present modem apparatus 102 further comprises a pseudo ringing signal generator 7 which generates a pseudo ringing signal based on the clock signal generated by a clock generator 12 when the instruction data "1" is written or stored into the register 5, and outputs the pseudo ringing signal to the ringing signal detector 6. The differences of the present modem apparatus 102 from that of the first preferred embodiment will be described in detail.

The ringing signal detector 6 detects a ringing signal inputted from the telephone line 20 through the connector 4, and operates to generate, for example, a detection signal having the High-level and output the signal to the modem circuit 2. The ringing signal detector 6 also detects the pseudo ringing signal (described in detail later) generated by the pseudo ringing signal generator 7, and outputs, for example, a detection signal having the High-level to the modem circuit 2. Further, the clock signal generated by the clock generator 12 is inputted to the pseudo ringing signal generator 7.

Figure 5:
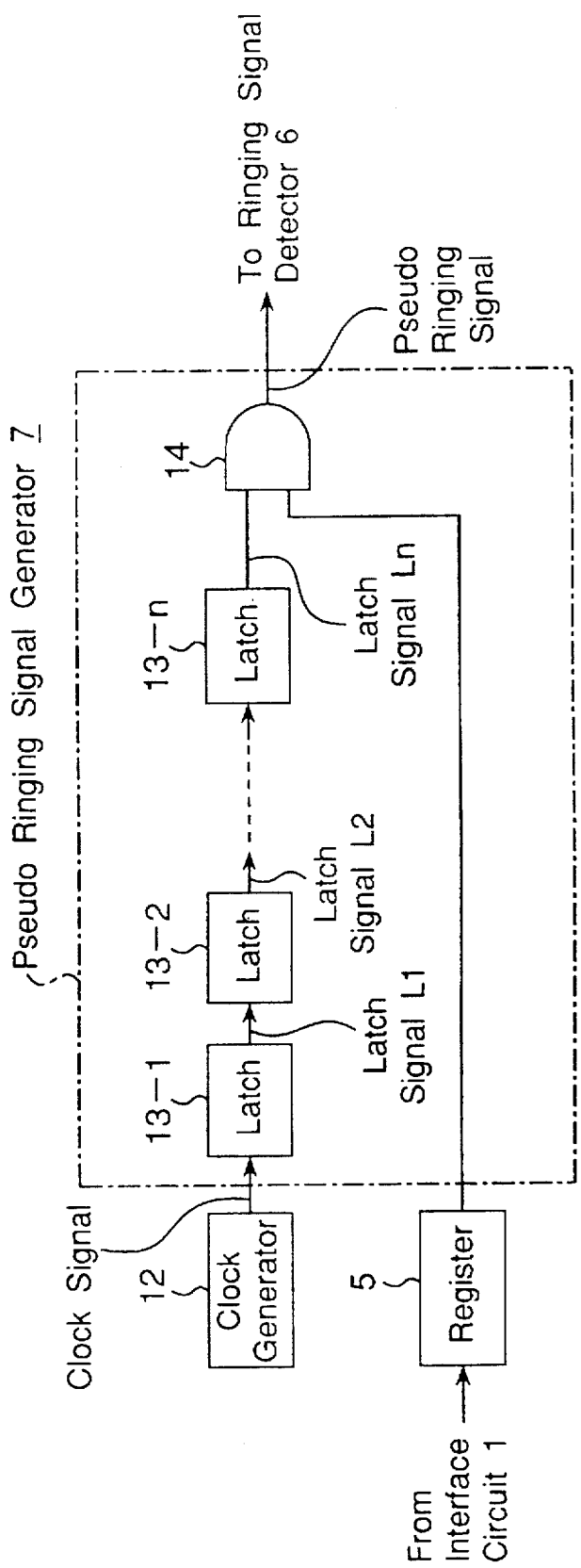
FIG. 5 is a block diagram of a pseudo ringing signal generator shown in FIG. 2.

FIG. 5 shows a construction of the pseudo ringing signal generator 7.

Referring to FIG. 5, the pseudo ringing signal generator 7 comprises the following components:

(a) a plurality of "n" latch circuits 13-1, 13-2 through 13-n which are connected in series, and each of which operates as a frequency-halving divider; and (b) an AND gate 14.

The clock generator 12 generates a rectangular-waveform pulse clock signal having a frequency of, for example, 10 MHz, and then, outputs the clock signal to the latch circuit 13-1. The latch circuit 13-1 operates as a frequency-halving divider. As shown in FIGS. 6A through 6C, the latch circuit 13-1 detects a leading edge of the clock signal inputted, switches over the level of a latch signal L1 to be outputted between either the High-level or the Low-level alternately, and then, outputs the resulting signal to the latch circuit 13-2. The latch circuit 13-2 operates as a frequency-halving divider which is similar to the latch circuit 13-1. As shown in FIGS. 6A through 6C, the latch circuit 13-2 detects a leading edge of the latch signal L1 inputted, switches over the level of a latch signal L2 to be outputted between either the High-level or the Low-level alternately, and then, outputs the resulting signal to the latch circuit 13-3. The latch circuits 13-3 through 13-N operate in a manner to those of the above-mentioned latch circuits 13-1 and 13-2. Therefore, the circuit comprised of the "n" latch circuits 13-1 through 13-n divides the clock frequency to 1/(2n) thereof, so that a latch signal Ln having the frequency of a predetermined ringing signal within a range of, for example, 15 Hz to 20 Hz is outputted as a pseudo ringing signal from the last latch circuit 13-n to the first input terminal of the AND gate 14.

On the other hand, when the instruction data "1" is written or stored into the register 5, the register 5 outputs a High-level signal to the second input terminal of the AND gate 14. Therefore, when the High-level signal is outputted from the register 5, the latch signal Ln outputted from the latch circuit 13-n is outputted as a pseudo ringing signal from the AND gate 14 to the ringing signal detector 6.

Referring back to FIG. 2, in response to the pseudo ringing signal generated by the pseudo ringing signal generator 7, the ringing signal detector 6 detects the pseudo ringing signal, generates a High-level detection signal, and outputs the detection signal to the modem circuit 2. In response to the detection signal, the modem circuit 2 outputs a control data representing incoming of a ringing signal to the host computer 10 through the interface circuit 1 and the connector 11.

It is to be noted that, in the above-mentioned second preferred embodiment, the ringing signal is generated for one second and then generation thereof is stopped for two seconds, in a manner shown in a timing chart of generation pattern of the first pseudo ringing signal shown in FIG. 7A. This generation pattern is preferably repeated in a manner similar to the above. For this operation, the host computer 10 repeats the operation of writing or storing the instruction data "1" into the register 5 for one second, resetting the register to "0", and then writing the instruction data "1" two seconds after the resetting. With the above-mentioned operation, the first pseudo ringing signal as shown in FIG. 7A can be generated. Further, a second pseudo ringing signal as shown in FIG. 7B is generated in a manner similar to that of the first pseudo ringing signal.

As described above, according to the second preferred embodiment, when the instruction data "1" is written into the register 5, the pseudo ringing signal generator 7 generates the pseudo ringing signal in response to this, and then, outputs the pseudo ringing signal to the ringing signal detector 6. In response to this, the ringing signal detector 6 detects the pseudo ringing signal, and then, generates the detection signal representing the detection of the ringing signal, and then, outputs the detection signal to the modem circuit 2. At that time, the modem circuit 2 executes the same operation as that in the time when the ringing signal comes to the modem apparatus 102. In other words, by only writing the instruction data "1" into the register 5 from the host computer 10 through the connector 11 and the interface circuit 1, the modem circuit 2 outputs the control data representing the incoming of the ringing signal to the host computer 10. Therefore, an inspection for confirming the operation of the incoming call to the modem circuit 2 can be confirmed from the host computer 10.

In the second preferred embodiment, the inspection for confirming the operation of the modem circuit 2 can be performed with the extremely simple construction of the register 5, the ringing signal detector 6 and the pseudo ringing signal generator 7 without using any exchange simulator nor the remote telephone terminal. Further, by only writing the instruction data "1" from the host computer 10 into the register 5, the inspection for confirming the operation of the modem circuit 2 can be performed. Therefore, the inspection preparing time can be remarkably reduced as compared with that of the prior art modem apparatus 100.

Furthermore, when the modem circuit 2 is a modem circuit having a low consumption current mode and a normal operation mode in the same way in that of the prior art modem apparatus 100, the modem circuit 2 can be waked up from the low consumption current mode to the normal operation mode by writing the instruction data "1" into the register 5, so that the operation of the modem circuit 2 can be confirmed and the modem circuit 2 can be made to execute the actual setting control processing.

In the above-mentioned second preferred embodiment, the data "1" is used as the instruction data to be written into the register 5. However, the present invention is not limited to this, and data having another predetermined value may be used.

In the above-mentioned second preferred embodiment, the register 5, the pseudo ringing signal generator 7 and the ringing signal detector 6 are constituted as the separate circuits. However, the present invention is not limited to this, and the register 5, the pseudo ringing signal generator 7 and the ringing signal detector 6 may be formed by circuit elements included in the interface circuit 1. Furthermore, the ringing signal detector 6 may be provided inside the NCU 3. Furthermore, the pseudo ringing signal generator 7 may generate the pseudo ringing signal by dividing or not by dividing a clock signal generated by a signal generator independent of and different from the clock generator 12.

Third Preferred Embodiment

Figure 3:
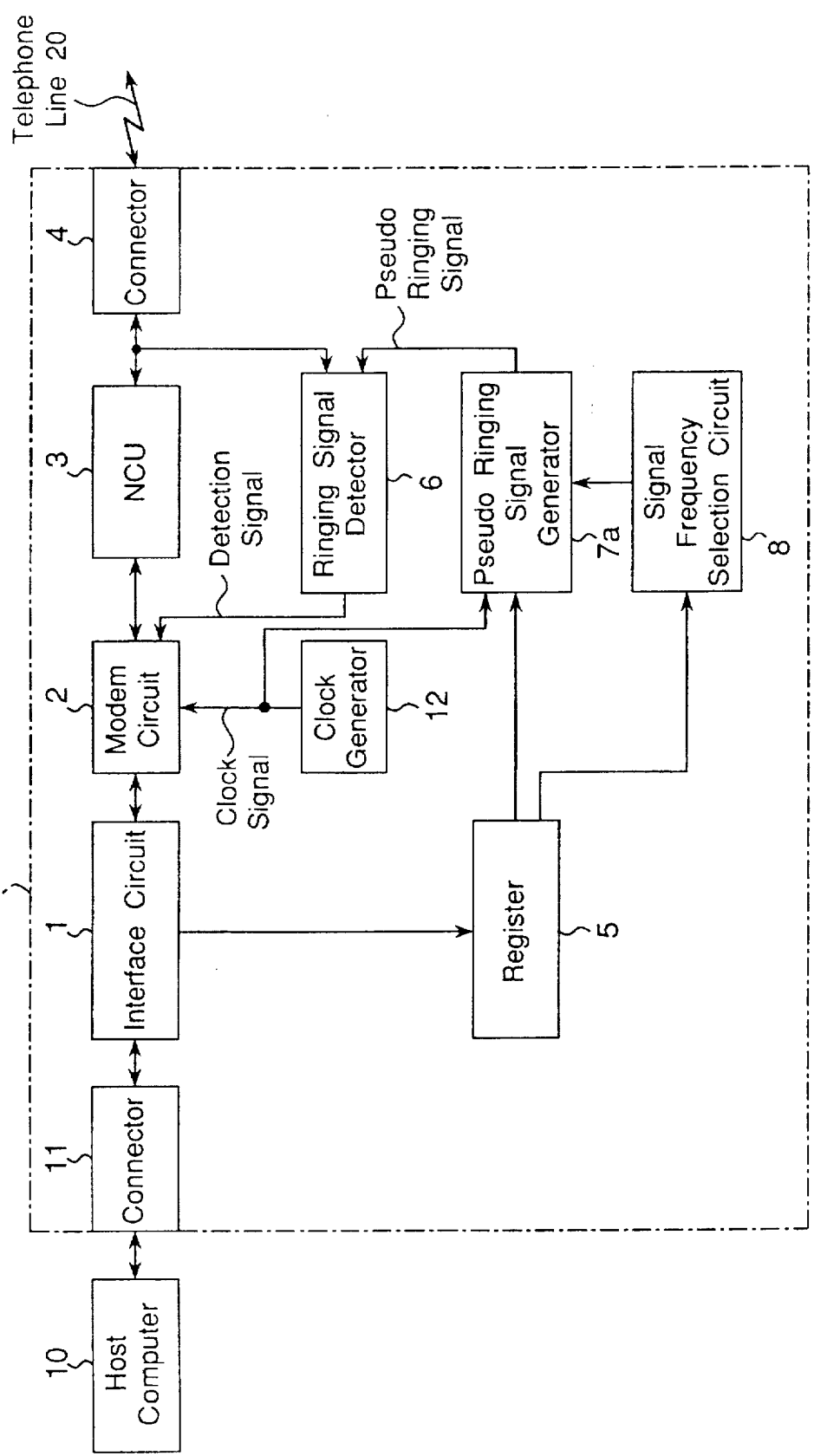
FIG. 3 is a block diagram of an IC card type modem apparatus according to a third preferred embodiment of the present invention.

FIG. 3 is a block diagram of an IC card type modem apparatus 103 according to a third preferred embodiment of the present invention.

Referring to FIG. 3, the same components as those of FIGS. 1, 2 and 8 are denoted by the same reference numerals shown in FIGS. 1, 2 and 8. The IC card type modem apparatus 103 of the third preferred embodiment differs from that of the second preferred embodiment in the following points:

(1) The present modem apparatus 103 comprises a pseudo ringing signal generator 7a which generates a ringing signal having a signal frequency instructed or controlled by a signal frequency selection circuit 8 instead of the pseudo ringing signal generator 7.

(2) The present modem apparatus further comprises a signal frequency selection circuit 8 which instructs and controls the pseudo ringing signal generator 7a by selectively setting the frequency of a pseudo ringing signal generated by the pseudo ringing signal generator 7a according to instruction data written into the register 5. The differences of the present modem apparatus 103 from that of the second preferred embodiment will be described in detail.

Referring to FIG. 3, when instruction data "1" to "6" larger than "0" is written into the register 5, the pseudo ringing signal generator 7a is controlled to output a pseudo ringing signal. According to the instruction data which is larger than "0" and which is written into the register 5, the signal frequency selection circuit 8 instructs and controls the pseudo ringing signal generator 7a so as to selectively set the frequency of the pseudo ringing signal to be generated by the pseudo ringing signal generator 7a. In the present case, when the instruction data "1" to "6" larger than "0" is written into the register 5, the pseudo ringing signal generator 7a divides the frequency of the clock signal generated by the clock generator 12 at a predetermined division ratio so as to generate a pseudo ringing signal, and outputs the pseudo ringing signal to the ringing signal detector 6. In response to this, the ringing signal detector 6 detects the pseudo ringing signal, and operates to generate, for example, the High-level detection signal representing the event of the detection, and then, outputs the detection signal to the modem circuit 2. Then, in response to this, the modem circuit 2 outputs a control data representing the incoming of the ringing signal to the host computer 10 through the interface circuit 1 and the connector 11.

For instance, when the instruction data "1", "2", "3", "4", "5" or "6" is written into the register 5, the pseudo ringing signal generator 7a changes the above-mentioned division ratio so as to respectively generate a pseudo ringing signal having a signal frequency of 15 Hz, 16 Hz, 17 Hz, 18 Hz, 19 Hz or 20 Hz, corresponding to the instruction data "1", "2", "3", "4", "5" or "6", and then, outputs the pseudo ringing signal to the ringing signal detector 6. With the above-mentioned operation of changing the instruction data to be written into the register 5, a pseudo ringing signal having a signal frequency corresponding to the signal frequency of the ringing signal which depends on the country in which the modem apparatus 103 is used can be generated.

It is to be noted that, in the above-mentioned third preferred embodiment, the ringing signal is generated for one second and then generation thereof is stopped for two seconds, in a manner shown in a timing chart of generation pattern of the first pseudo ringing signal shown in FIG. 7A. This generation pattern is preferably repeated in a manner similar to the above. For this operation, the host computer 10 repeats the operation of writing the instruction data "1" into the register 5 for one second, resetting the register to "0", and then writing the instruction data "1" two seconds after the resetting. With the above-mentioned operation, the first pseudo ringing signal as shown in FIG. 7A can be generated. Further, a second pseudo ringing signal as shown in FIG. 7B is generated in a manner similar to that of the first pseudo ringing signal.

As described above, according to the third preferred embodiment, when the instruction data is written into the register 5, the signal frequency selection circuit 8 instructs and controls the pseudo ringing signal generator 7a in response to the instruction data so as to selectively set the signal frequency of the pseudo ringing signal to be generated by the pseudo ringing signal generator 7a. In response to this, the pseudo ringing signal generator 7a generates a pseudo ringing signal having a signal frequency determined under the instruction and control of the signal frequency selection circuit 8, and then, outputs the pseudo ringing signal to the ringing signal detector 6. In response to this, the ringing signal detector 6 detects the pseudo ringing signal, and then, outputs a detection signal representing the detection to the modem circuit 2. In the present case, the modem circuit 2 executes the same operation as that in the time when a ringing signal comes to the modem apparatus 103. In other words, by only writing a predetermined instruction data into the register 5 from the host computer 10 through the connector 11 and the interface circuit 1, the modem circuit 2 outputs the control data representing the incoming of the ringing signal to the host computer 10. Therefore, an inspection for confirming the operation of the incoming call to the modem circuit 2 can be performed from the host computer 10. In the third preferred embodiment, the inspection for confirming the operation of the modem circuit 2 can be performed with the extremely simple construction of the register 5, the ringing signal detector 6, the pseudo ringing signal generator 7a and the signal frequency selection circuit 8 without using any exchange simulator nor the remote telephone terminal. Further, by only writing the predetermined instruction data from the host computer 10 into the register 5, the inspection for confirming the operation of the modem circuit 2 can be performed. Therefore, an inspection preparing time can be remarkably reduced as compared with that of the prior art modem apparatus 100.

Furthermore, by changing the above-mentioned instruction data, the signal frequency of the pseudo ringing signal can be changed. With the above-mentioned arrangement, a pseudo ringing signal having a signal frequency corresponding to the signal frequency of the ringing signal which depends on the country in which the modem apparatus 103 is used can be generated. In particular, the signal frequency of the ringing signal can be easily changed, and an inspection apparatus is allowed to have an extremely simple construction.

Furthermore, when the modem circuit 2 is a modem circuit having a low consumption current mode and a normal operation mode in the same way in that of the prior art modem apparatus 100, the modem circuit 2 can be waked up from the low consumption current mode to the normal operation mode by writing the predetermined instruction data into the register 5, so that the operation of the modem circuit 2 can be confirmed and the modem circuit 2 can be made to execute the actual setting control processing.

In the above-mentioned third preferred embodiment, the above-mentioned predetermined instruction data is used as the instruction data to be written into the register 5. However, the present invention is not limited to this, and data having another predetermined value may be used.

In the above-mentioned third preferred embodiment, the register 5, the pseudo ringing signal generator 7a, the signal frequency selection circuit 8 and the ringing signal detector 6 are constituted as the separate circuits. However, the present invention is not limited to this, and the register 5, the pseudo ringing signal generator 7a, the signal frequency selection circuit 8 and the ringing signal detector 6 may be formed by circuit elements included in the interface circuit 1. Furthermore, the ringing signal detector 6 may be provided inside the NCU 3. Furthermore, the pseudo ringing signal generator 7a may generate the pseudo ringing signal by dividing or not by dividing a clock signal generated by a signal generator independent of and different from the clock generator 12.

Fourth Preferred Embodiment

Figure 4:
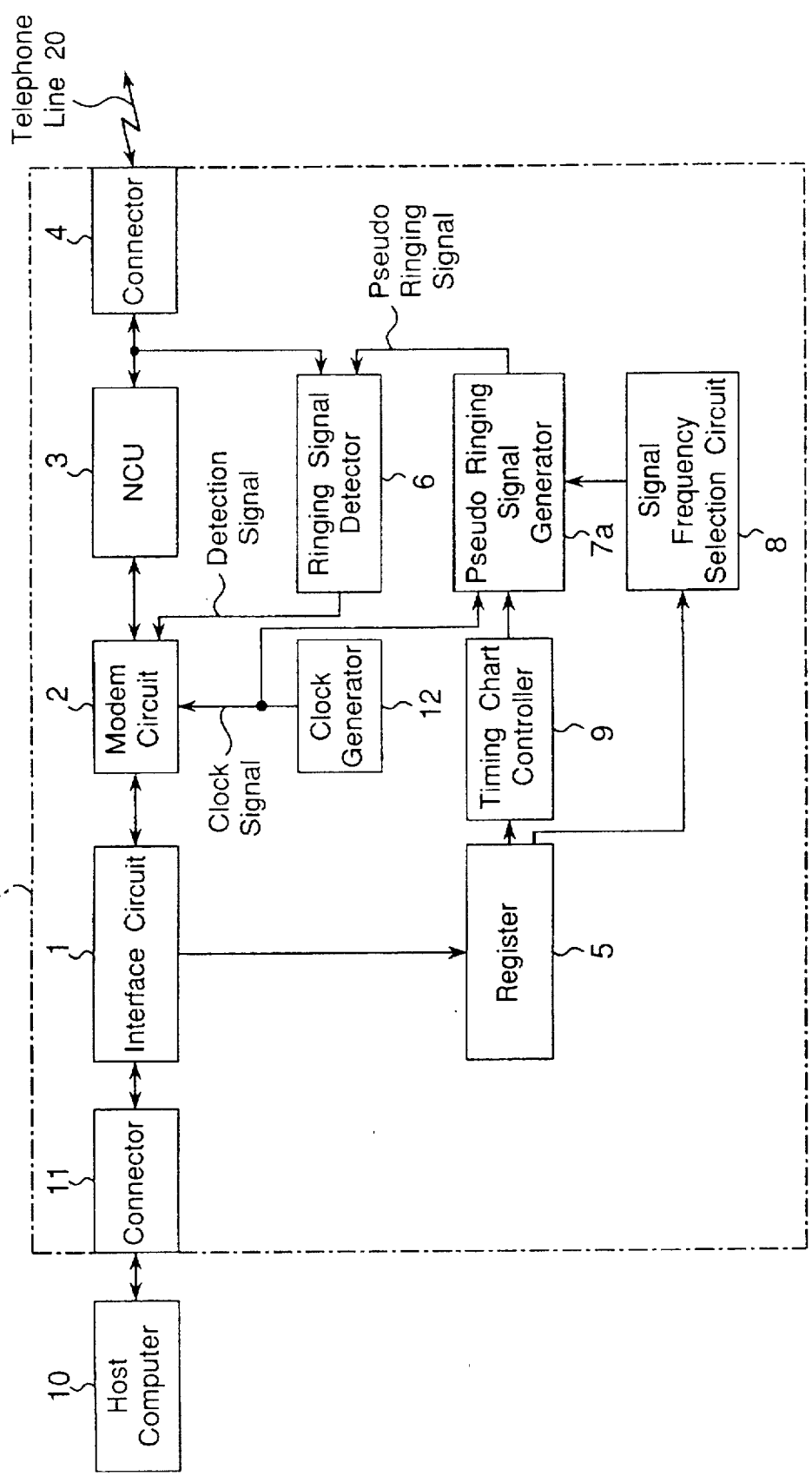
FIG. 4 is a block diagram of an IC card type modem apparatus according to a fourth preferred embodiment of the present invention.

FIG. 4 is a block diagram of an IC card type modem apparatus 104 according to a fourth preferred embodiment of the present invention.

In FIG. 4, the same components as those of FIGS. 1, 2, 3 and 8 are denoted by the same reference numerals shown in FIGS. 1, 2, 3 and 8. Referring to FIG. 4, the IC card type modem apparatus 104 of the fourth preferred embodiment differs from that of the third preferred embodiment in the following points:

(1) The present modem apparatus 104 further comprises a timing chart controller 9 which is connected between the register 5 and the pseudo ringing signal generator 7a, and operates to control the pseudo ringing signal generator 7a, according to the instruction data written into the register 5, to select either the following first operation mode or the following second operation mode:

(a) the first operation mode in which the pseudo ringing signal generator 7a generates the first pseudo ringing signal, according to the timing chart of the generation pattern of the signal as shown in FIG. 7A; and (b) the second operation in which the pseudo ringing signal generator 7a generates the second pseudo ringing signal, according to the timing chart of the generation pattern of the signal as shown in FIG. 7B.

The differences of the present modem apparatus 104 from that of the third preferred embodiment will be described in detail.

Referring to FIG. 4, when instruction data "1" to "2" exceeding "0" is written into the register 5, the pseudo ringing signal generator 7a is controlled to output a pseudo ringing signal. According to the instruction data which is larger than "0" and is written into the register 5, the signal frequency selection circuit 8 instructs and controls the pseudo ringing signal generator 7a so as to selectively set the frequency of the pseudo ringing signal to be generated by the pseudo ringing signal generator 7a. On the other hand, according to the instruction data which is larger than "0" and written into the register 5, the timing chart controller 9 instructs and controls the pseudo ringing signal generator 7a so as to selectively set a timing chart of a generation pattern of the pseudo ringing signal to be generated by the pseudo ringing signal generator 7a.

Table 1 shows exemplified relations between the instruction data to be written into the register 5 and the signal frequencies and the timing charts of the generation patterns of the pseudo ringing signal to be generated by the pseudo ringing signal generator 7a under the control of the signal frequency selection circuit 8 and the timing chart controller 9.

TABLE 1

| Instruction data | Signal frequency | Timing chart of generation pattern |
|---|---|---|
| "0" | Not generated | Not generated |
| "1" | 15 Hz | First pseudo ringing signal (FIG. 7A) |
| "2" | 16 Hz | First pseudo ringing signal (FIG. 7A) |
| "3" | 17 Hz | First pseudo ringing signal (FIG. 7A) |
| "4" | 18 Hz | First pseudo ringing signal (FIG. 7A) |
| "5" | 19 Hz | First pseudo ringing signal (FIG. 7A) |
| "6" | 20 Hz | First pseudo ringing signal (FIG. 7A) |
| "7" | 15 Hz | Second pseudo ringing signal (FIG. 7B) |
| "8" | 16 Hz | Second pseudo ringing signal (FIG. 7B) |
| "9" | 17 Hz | Second pseudo ringing signal (FIG. 7B) |
| "10" | 18 Hz | Second pseudo ringing signal (FIG. 7B) |
| "11" | 19 Hz | Second pseudo ringing signal (FIG. 7B) |
| "12" | 20 Hz | Second pseudo ringing signal (FIG. 7B) |

In this case, when instruction data "1" to "12" larger than "0" is written into the register 5, the pseudo ringing signal generator 7a generates a pseudo ringing signal by dividing the clock signal generated by the clock generator 12 at a predetermined division ratio, and then, outputs the pseudo ringing signal to the ringing signal detector 6. When the instruction data "1" to "12" exceeding "0" is written into the register 5, the timing chart controller 9 generates a High-level control signal according to the predetermined generation pattern as shown in FIG. 7A or FIG. 7B, and then, outputs the control signal to the pseudo ringing signal generator 7a. Then, the pseudo ringing signal generator 7a generates a pseudo ringing signal at the signal frequency which is selectively set by the signal frequency selection circuit 8 according to the timing chart of the generation pattern determined under the control of the timing chart controller 9, and then, outputs the pseudo ringing signal to the ringing signal detector 6. In response to this, the ringing signal detector 6 detects the pseudo ringing signal, generates, for example, a High-level detection signal representing the detection, and then, outputs the detection signal to the modem circuit 2. Thereafter, in response to this, the modem circuit 2 outputs a control data representing the incoming of the ringing signal to the host computer 10 through the interface circuit 1 and the connector 11.

Therefore, with the above-mentioned operation of changing the instruction data to be written into the register 5, a pseudo ringing signal corresponding to the signal frequency and the timing chart of the generation pattern of the ringing signal which depends on the country in which the modem apparatus 103 is used can be generated.

It is to be noted that, in the above-mentioned fourth preferred embodiment, there is no need to control the generation pattern of the pseudo ringing signal on the side of the host computer 10 according to the timing chart of the generation pattern of the pseudo ringing signal in contrast to each of the first through third preferred embodiments. Therefore, software construction in the host computer 10 can be simplified as compared with those of the first through third preferred embodiments.

As described above, according to the fourth preferred embodiment, when the predetermined instruction data is written into the register 5, the signal frequency selection circuit 8 instructs and controls the pseudo ringing signal generator 7a in response to this so as to selectively set the signal frequency of the pseudo ringing signal to be generated by the pseudo ringing signal generator 7a. On the other hand, the timing chart controller 9 instructs and controls the pseudo ringing signal generator 7a so as to selectively set the timing chart of the generation pattern of the pseudo ringing signal to be generated by the pseudo ringing signal generator 7a. In response to this, the pseudo ringing signal generator 7a generates a pseudo ringing signal having a signal frequency determined under the instruction and control of the signal frequency selection circuit 8 according to the timing chart of the generation pattern determined under the instruction and control of the timing chart controller 9, and then, outputs the pseudo ringing signal to the ringing signal detector 6. In response to this, the ringing signal detector 6 detects the pseudo ringing signal, and then, outputs a detection signal representing the detection to the modem circuit 2. In the present case, the modem circuit 2 executes the same operation as that in the time when a ringing signal comes to the modem apparatus 104. In other words, by only writing a predetermined instruction data into the register 5 from the host computer 10 through the connector 11 and the interface circuit 1, the modem circuit 2 outputs the control data representing the incoming of a ringing signal to the host computer 10. Therefore, an inspection for confirming the operation of the incoming call to the modem circuit 2 can be performed from the host computer 10. In the fourth preferred embodiment, the inspection for confirming the operation of the modem circuit 2 can be performed with the extremely simple construction of the register 5, the ringing signal detector 6, the pseudo ringing signal generator 7a and the signal frequency selection circuit 8 without using any exchange simulator nor the remote telephone terminal. Further, by only writing the predetermined instruction data from the host computer 10 into the register 5, the inspection for confirming the operation of the modem circuit 2 can be performed. Therefore, an inspection preparing time can be remarkably reduced as compared with that of the prior art modem apparatus 100.

Furthermore, by changing the above-mentioned instruction data, the signal frequency and/or the timing chart of the generation pattern of the pseudo ringing signal can be changed. With the above-mentioned arrangement, a pseudo ringing signal having a signal frequency corresponding to the signal frequency and the timing chart of the generation pattern of the ringing signal which depends on the country in which the modem apparatus 103 is used can be generated. In particular, the signal frequency and the timing chart of the generation pattern of the ringing signal can be easily changed, an inspection apparatus is allowed to have an extremely simple construction.

Furthermore, when the modem circuit 2 is a modem circuit having a low consumption current mode and a normal operation mode in the same way in that of the prior art modem apparatus 100, the modem circuit 2 can be waked up from the low consumption current mode to the normal operation mode by writing the predetermined instruction data into the register 5, so that the operation of the modem circuit 2 can be confirmed and the modem circuit 2 can be made to execute the actual setting control processing.

In the above-mentioned fourth preferred embodiment, the above-mentioned predetermined data is used as the instruction data to be written into the register 5. However, the present invention is not limited to this, and data having another predetermined value may be used.

In the above-mentioned fourth preferred embodiment, the register 5, the pseudo ringing signal generator 7a, the signal frequency selection circuit 8, the timing chart controller 9 and the ringing signal detector 6 are constituted as the separate circuits. However, the present invention is not limited to this, and the register 5, the pseudo ringing signal generator 7a, the signal frequency selection circuit 8, the timing chart controller 9 and the ringing signal detector 6 may be formed by the circuit elements in the interface circuit 1. Furthermore, the ringing signal detector 6 may be provided inside the NCU 3. Furthermore, the pseudo ringing signal generator 7a may generate the pseudo ringing signal by dividing or not by dividing a clock signal generated by a signal generator independent of and different from the clock generator 12.

The relations between the instruction data to be written into the register 5 and the signal frequencies and the timing charts of the generation patterns of the pseudo ringing signal to be generated by the pseudo ringing signal generator 7a under the control of the signal frequency selection circuit 8 and the timing chart controller 9, those shown in Table 1 of the fourth preferred embodiment, are preferred examples, and the present invention is not limited to this.

Other Preferred Embodiments

Figure 10:
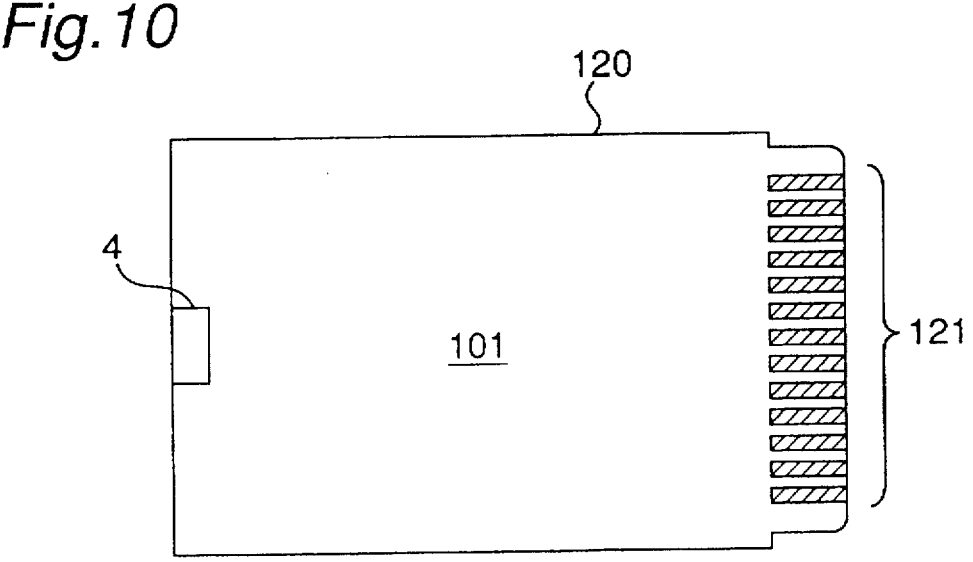
FIG. 10 is a plan view showing an external appearance of a printed circuit board type modem apparatus of a modification example.

The modem apparatuses of the above-mentioned embodiments are the IC card type modem apparatuses, each of which is connected directly to the bus of the host computer 10. However, the present invention is not limited to the IC card type modem apparatuses. The modem apparatus may be, for example, a printed circuit board type modem apparatus as shown in FIG. 10, which is to be connected directly to the bus of the host computer 10 and is installed or built in the host computer 10, and in which a circuit of the modem apparatus is formed on a printed circuit board 120. In the present case, a plurality of electrodes 121 for connector connection (corresponding to the connector 11) to be connected to the bus of the host computer 10 are formed at one end in the longitudinal direction of the printed circuit board 120, and a connector 4 for telephone line connection is formed at another end in the longitudinal direction of the printed circuit board 120.

In each of the above-mentioned embodiments, a pseudo ringing signal having a frequency of 15 Hz to 20 Hz is generated. However, the present invention is not limited to this, and a pseudo ringing signal having the other signal frequency which is, for example, larger than 20 Hz and reaches up to 68 Hz may be generated.

In each of the above-mentioned embodiments, the modem apparatus is connected to the telephone line 20. However, the present invention is not limited to this, and the modem apparatus may be connected to the other communication line such as an ISDN line or the like.

In each of the above-mentioned embodiments, there is provided the register 5 for storing the instruction data. However, the present invention is not limited to this, and the other storage means such as a storage circuit, a memory, or the like may be provided.

As described in detail above, according to the modem apparatus of the present first invention, the ringing signal detecting means further comprises storage means for receiving from the computer and storing therein the instruction data for outputting the detection signal, and when the instruction data is stored in the storage means, the ringing signal detecting means outputs the detection signal to the modem circuit. Therefore, when the instruction data is stored in the storage means, the ringing signal detecting means operates or behaves as if a ringing signal came from the communication line such as a telephone line or the like. Consequently, the modem circuit executes the same operation as that in the time when a ringing signal comes to the modem apparatus. In this case, the modem circuit outputs a control data representing the incoming of the ringing signal to the computer, and therefore, the inspection for confirming the operation of the incoming call to the modem circuit can be performed from the computer. In this case, the inspection for confirming the operation of the modem circuit can be performed by the extremely simple construction of the storage means. Furthermore, by only writing a predetermined instruction data from the computer into the storage means, the inspection for confirming the operation of the modem circuit can be performed, and therefore, the inspection preparing time can be remarkably reduced as compared with that of the prior art modem apparatus 100. Furthermore, when the modem circuit is a modem circuit having a low consumption current mode and a normal operation mode in the same way in that of the prior art modem apparatus 100, the modem circuit can be waked up from the low consumption current mode to the normal operation mode by writing or storing the instruction data into the storage means, so that the operation of the modem circuit can be confirmed and the modem circuit can be made to execute the actual setting control processing.

According to the modem apparatus of the present second invention, the modem apparatus further comprises storage means for receiving from the computer and storing therein the instruction data for instructing generation of a pseudo ringing signal, and pseudo ringing signal generating means for generating a pseudo ringing signal and outputting the pseudo ringing signal to ringing signal detecting means when the instruction data is stored in the storage means. Therefore, when the instruction data is stored in the storage means, the pseudo ringing signal generating means generates a pseudo ringing signal and outputs the pseudo ringing signal to the ringing signal detecting means. The ringing signal detecting means operates or behaves as if a ringing signal came from the communication line such as a telephone line or the like. Consequently, the modem circuit executes the same operation as that in the time when a ringing signal comes to the modem apparatus. In this case, the modem circuit outputs a control data representing the incoming of the ringing signal to the computer, and therefore, the inspection for confirming the operation of the incoming call to the modem circuit can be performed from the computer. In this case, the inspection for confirming the operation of the modem circuit can be performed by the extremely simple construction of the storage means. Furthermore, by only writing a predetermined instruction data from the computer into the storage means, the inspection for confirming the operation of the modem circuit can be performed, and therefore, the inspection preparing time can be remarkably reduced as compared with that of the prior art modem apparatus 100. Furthermore, when the modem circuit is a modem circuit having a low consumption current mode and a normal operation mode in the same way in that of the prior art modem apparatus 100, the modem circuit can be waked up from the low consumption current mode to the normal operation mode by writing or storing the instruction data into the storage means, so that the operation of the modem circuit can be confirmed and the modem circuit can be made to execute the actual setting control processing.

In the modem apparatus of the present second invention, the above-mentioned instruction data is instruction data for generating the pseudo ringing signal and instructing the signal frequency of the pseudo ringing signal. The modem apparatus further comprises signal frequency selecting means for selectively setting the signal frequency of the pseudo ringing signal according to the instruction data stored in the storage means and controlling the pseudo ringing signal generating means so as to generate the pseudo ringing signal at the signal frequency set as above. Therefore, by changing the instruction data, the signal frequency of the pseudo ringing signal can be changed. With the above-mentioned arrangement, a pseudo ringing signal having a signal frequency corresponding to the signal frequency of the ringing signal which depends on the country in which the modem apparatus is used can be generated. In particular, the signal frequency of the ringing signal can be easily changed, thereby allowing the inspection apparatus to have an extremely simple construction.

In the modem apparatus of the present second invention, the above-mentioned instruction data is instruction data for generating the pseudo ringing signal, instructing the signal frequency of the pseudo ringing signal, and for controlling the timing chart of the generation pattern of the pseudo ringing signal. The modem apparatus further comprises timing chart control means for selectively setting the timing chart of the generation pattern of the pseudo ringing signal according to the instruction data stored in the storage means and controlling the pseudo ringing signal generating means so as to generate the pseudo ringing signal according to the timing chart of the generation pattern set as above. Therefore, by changing the instruction data, the signal frequency and/or the timing chart of the generation pattern of the pseudo ringing signal can be changed. With the above-mentioned arrangement, a pseudo ringing signal having a signal frequency corresponding to the signal frequency and the timing chart of the generation pattern of the ringing signal which depends on the country in which the modem apparatus is used can be generated. In particular, the signal frequency and the timing chart of the generation pattern of the ringing signal can be easily changed, thereby allowing the inspection apparatus to have an extremely simple construction.

In the modem apparatus of the present second invention, the modem apparatus further comprises clock generating means for generating a clock signal having a predetermined frequency and outputting the clock signal to the modem circuit, and the pseudo ringing signal generating means generates a pseudo ringing signal by dividing the frequency of the clock signal generated by the clock generating means. With the above-mentioned arrangement, the construction of the pseudo ringing signal generating means can be simplified, thereby allowing the total construction of the modem apparatus to be simplified.

In the modem apparatus of the present second invention, the pseudo ringing signal generating means comprises a plurality of latch circuits connected in series. With the above-mentioned arrangement, the construction of the pseudo ringing signal generating means can be further simplified, thereby allowing the total construction of the modem apparatus to be further simplified.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A modem apparatus, comprising:
    a modem circuit, operatively connected to a computer and a communication line, for modulating a carrier wave signal so as to generate a modulated signal according to signal data inputted from said computer, for outputting the modulated signal through said communication line, for demodulating a modulated signal received through said communication line so as to generate another signal data, and for outputting another signal data to said computer;
    ringing signal detecting means for detecting a ringing signal received through said communication line, for generating a detection signal, and for outputting the detection signal to said modem circuit; and
    storage means for receiving from the computer, instruction data for instructing said ringing signal detecting means to output the detection signal, and for storing therein the instruction data,
    wherein said ringing signal detecting means outputs the detection signal to said modem circuit in response to the instruction data being stored in said storage means without receiving a pseudo ringing signal.

2. A modem apparatus, comprising:
    a modem circuit, operatively connected to a host computer and a communication line, for modulating a carrier wave signal so as to generate a modulated signal according to signal data inputted from the host computer, for outputting the modulated signal through said communication line, for demodulating a modulated signal received through said communication line so as to generate another signal data, and for outputting another signal data to the host computer;
    ringing signal detecting means for detecting a ringing signal received through said communication line, for generating a detection signal, and for outputting the detection signal to said modem circuit;
    storage means for receiving instruction data from the host computer and for storing therein the instruction data; and
    pseudo ringing signal generating means for generating a pseudo ringing signal in response to the instruction data being stored in said storage means by the host computer, and for outputting the pseudo ringing signal to said ringing signal detecting means.

3. The modem apparatus as claimed in claim 2, wherein the instruction data is used to generate the pseudo ringing signal, and to indicate a signal frequency of the pseudo ringing signal, and
    wherein said modem apparatus further comprises:
        signal frequency selecting means for selectively setting the signal frequency of the pseudo ringing signal among a plurality of signal patterns of the pseudo ringing signal according to the instruction data stored in said storage means, and for controlling the pseudo ringing signal generating means to generate the pseudo ringing signal at the set signal frequency.

4. The modem apparatus as claimed in claim 3, wherein the instruction data is used to generate the pseudo ringing signal, to indicate a signal frequency of the pseudo ringing signal, and to control a timing chart of a generation pattern of the pseudo ringing signal, and
    wherein said modem apparatus further comprises:
        timing chart control means for selectively setting the timing chart of the generation pattern of the pseudo ringing signal among a plurality of generation patterns of the pseudo ringing signal according to the instruction data stored in said storage means, and for controlling the pseudo ringing signal generating means so as to generate the pseudo ringing signal according to the set timing chart of the generation pattern.

5. The modem apparatus as claimed in claim 2, further comprising:
    clock generating means for generating a clock signal having a predetermined frequency, and for outputting the clock signal to said modem circuit, and
    wherein the pseudo ringing signal generating means generates the pseudo ringing signal by dividing a frequency of the clock signal generated by said clock generating means.

6. The modem apparatus as claimed in claim 3, further comprising:
    clock generating means for generating a clock signal having a predetermined frequency, and for outputting the clock signal to said modem circuit, and
    wherein said pseudo ringing signal generating means generates the pseudo ringing signal by dividing a frequency of the clock signal generated by said clock generating means.

7. The modem apparatus as claimed in claim 4, further comprising:
    clock generating means for generating a clock signal having a predetermined frequency, and for outputting the clock signal to said modem circuit, and wherein the pseudo ringing signal generating means generates the pseudo ringing signal by dividing a frequency of the clock signal generated by said clock generating means.

8. The modem apparatus as claimed in claim 5, wherein the pseudo ringing signal generating means comprises a plurality of latch circuits which are operatively connected in series.

9. The modem apparatus as claimed in claim 1, wherein said modem apparatus is an IC card type modem apparatus in which a circuit of said modem apparatus is provided inside an IC card type package.

10. The modem apparatus as claimed in claim 2, wherein said modem apparatus is an IC card type modem apparatus in which a circuit of said modem apparatus is provided inside an IC card type package.

11. The modem apparatus as claimed in claim 3, wherein said modem apparatus is an IC card type modem apparatus in which a circuit of said modem apparatus is provided inside an IC card type package.

12. The modem apparatus as claimed in claim 4, wherein said modem apparatus is an IC card type modem apparatus in which a circuit of said modem apparatus is provided inside an IC card type package.

13. The modem apparatus as claimed in claim 5, wherein said modem apparatus is an IC card type modem apparatus in which a circuit of said modem apparatus is provided inside an IC card type package.

14. The modem apparatus as claimed in claim 8, wherein said modem apparatus is an IC card type modem apparatus in which a circuit of said modem apparatus is provided inside an IC card type package.

15. The modem apparatus as claimed in claim 1, wherein said modem apparatus is a printed circuit board type modem apparatus in which a circuit of said modem apparatus is disposed on a printed circuit board.

16. The modem apparatus as claimed in claim 2, wherein said modem apparatus is a printed circuit board type modem apparatus in which a circuit of said modem apparatus is disposed on a printed circuit board.

17. The modem apparatus as claimed in claim 3, wherein said modem apparatus is a printed circuit board type modem apparatus in which a circuit of said modem apparatus is disposed on a printed circuit board.

18. The modem apparatus as claimed in claim 4, wherein said modem apparatus is a printed circuit board type modem apparatus in which a circuit of said modem apparatus is disposed on a printed circuit board.

19. The modem apparatus as claimed in claim 5, wherein said modem apparatus is a printed circuit board type modem apparatus in which a circuit of said modem apparatus is disposed on a printed circuit board.

20. The modem apparatus as claimed in claim 8, wherein said modem apparatus is a printed circuit board type modem apparatus in which a circuit of said modem apparatus is disposed on a printed circuit board.

* * * * *